US012690955B2

(12) United States Patent (10) Patent No.: US 12,690,955 B2
Rampf et al. (45) Date of Patent: Jul. 28, 2026

(54) FORMING APPARATUS FOR A DENTAL OBJECT

(71) Applicant: Ivoclar Vivadent AG, Schaan (LI)

(72) Inventors: Markus Rampf, Seewis Dorf (CH);
Marc Dittmer, Feldkirch (AT);
Christian Niedrig, Rüthi (CH);
Christian Ritzberger, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 839 days.

(21) Appl. No.: 18/046,437

(22) Filed: Oct. 13, 2022

(65) Prior Publication Data

US 2023/0121316 A1 Apr. 20, 2023

(30) Foreign Application Priority Data

Oct. 14, 2021 (EP) .................................... 21202631

(51) Int. Cl.
A61C 13/08 (2006.01)
A61C 13/00 (2006.01)

(52) U.S. Cl.
CPC ........ A61C 13/082 (2013.01); A61C 13/0004 (2013.01); A61C 13/0013 (2013.01)

(58) Field of Classification Search
CPC .............. A61C 13/082; A61C 13/0004; A61C 13/0013
See application file for complete search history.

(56) References Cited

U.S. PATENT DOCUMENTS

| | | | | |
|---|---|---|---|---|
| 2,628,160 | A | | 2/1953 | Stookey |
| 2,971,853 | A | | 2/1961 | Stookey |
| 3,447,892 | A | * | 6/1969 | Clark ......................... A61L 2/10 422/291 |
| 3,769,517 | A | * | 10/1973 | Coleman ................ B01J 19/123 250/455.11 |
| 3,852,032 | A | * | 12/1974 | Urbach .................. A61L 12/063 351/159.6 |
| 3,955,922 | A | * | 5/1976 | Moulthrop ................ A61L 2/10 312/31 |
| 4,182,665 | A | * | 1/1980 | Mibu .................... C09D 175/16 522/182 |
| 4,208,573 | A | | 6/1980 | Zahnfabrik |
| 4,424,188 | A | * | 1/1984 | DiGeronimo ........... B65B 55/04 422/20 |
| 4,480,044 | A | | 10/1984 | McAlinn |
| 4,534,282 | A | * | 8/1985 | Marinoza ............... A23B 2/055 210/764 |
| 4,645,649 | A | | 2/1987 | Nagao |
| 5,062,877 | A | | 11/1991 | Borrelli et al. |
| 5,094,619 | A | | 3/1992 | McLaughlin |

(Continued)

FOREIGN PATENT DOCUMENTS

| | | |
|---|---|---|
| CN | 109896729 A1 | 6/2019 |
| DE | 102005003595 A1 | 7/2006 |

(Continued)

*Primary Examiner* — Nicholas D Lucchesi
(74) *Attorney, Agent, or Firm* — Ann M. Knab; Thad McMurray

(57) ABSTRACT

A forming system (100) for a dental object (101), having a forming apparatus (127) for producing a predetermined spatial shape of the dental object (101); and a radiation source (105) for emitting radiation having a wavelength shorter than 350 nm onto the material (129) of the dental object (101).

9 Claims, 2 Drawing Sheets

(56) References Cited

U.S. PATENT DOCUMENTS

| | | | |
|---|---|---|---|
| 5,135,686 A | 8/1992 | Masuhara et al. | |
| 5,162,130 A | 11/1992 | McLaughlin | |
| 5,503,721 A * | 4/1996 | Hearst | B01L 7/52 |
| | | | 422/186.3 |
| 5,547,635 A | 8/1996 | Duthie | |
| 5,698,020 A | 12/1997 | Salz et al. | |
| 7,262,144 B2 | 8/2007 | Schreder et al. | |
| 7,829,489 B2 | 11/2010 | Borrelli et al. | |
| 8,047,021 B2 | 11/2011 | Schweiger et al. | |
| 8,721,336 B2 | 5/2014 | Rheinberger et al. | |
| 9,949,809 B2 | 4/2018 | Lewis et al. | |
| 10,617,495 B2 | 4/2020 | Korten et al. | |
| 11,408,629 B2 | 8/2022 | Lee | |
| 2005/0263719 A1 | 12/2005 | Ohdaira | |
| 2006/0147339 A1 | 7/2006 | Hunter | |
| 2006/0261503 A1 | 11/2006 | Sago et al. | |
| 2009/0246739 A1 | 10/2009 | Jussel et al. | |
| 2012/0012577 A1 | 1/2012 | Jussel et al. | |
| 2012/0309607 A1 | 12/2012 | Durschang | |
| 2013/0270445 A1 | 10/2013 | Gaska et al. | |
| 2013/0295523 A1 | 11/2013 | Durschang | |
| 2014/0113237 A1 | 4/2014 | Rohner | |
| 2014/0141960 A1 | 5/2014 | Borczuch-Laczka et al. | |
| 2014/0200129 A1 | 7/2014 | Durschang | |
| 2014/0231408 A1 | 8/2014 | Jussel | |
| 2014/0252272 A1 | 9/2014 | Durschang | |
| 2014/0339216 A1 | 11/2014 | Jussel | |
| 2014/0370464 A1 | 12/2014 | Kounga | |
| 2015/0140274 A1 | 5/2015 | Burke | |
| 2015/0374589 A1 | 12/2015 | Rampf | |
| 2016/0057816 A1 | 2/2016 | Alias | |
| 2016/0257607 A1 | 9/2016 | Ritzberger | |
| 2016/0340228 A1 | 11/2016 | Schreder et al. | |
| 2017/0088456 A1 | 3/2017 | Rampf | |
| 2017/0144919 A1 | 5/2017 | Krolikowski et al. | |
| 2017/0156828 A1 | 6/2017 | Leeson | |
| 2017/0355636 A1 | 12/2017 | Borrelli | |
| 2018/0009701 A1 | 1/2018 | Rampf | |
| 2018/0244563 A1 | 8/2018 | Dittmer | |
| 2018/0256297 A1 | 9/2018 | Vollmann | |
| 2018/0290913 A1 | 10/2018 | Gödiker | |
| 2019/0167395 A1 | 6/2019 | Baholzer | |
| 2019/0217534 A1 | 7/2019 | Verboomen | |
| 2020/0000563 A1 | 1/2020 | Specht | |
| 2022/0318520 A1 | 10/2022 | Pouran Ben Veyseh et al. | |
| 2022/0318683 A1 | 10/2022 | Sawaf et al. | |
| 2023/0012752 A1 | 1/2023 | Ritzberger | |
| 2023/0119981 A1 | 4/2023 | Niedrig | |
| 2023/0125010 A1 | 4/2023 | Ritzberger | |

FOREIGN PATENT DOCUMENTS

| | | | |
|---|---|---|---|
| FR | 2507296 A1 | 12/1982 | |
| JP | 3203603 U | 4/2016 | |
| WO | 2004051716 A1 | 6/2004 | |
| WO | 2011113568 A1 | 9/2011 | |
| WO | 2012057252 A1 | 5/2012 | |
| WO | 2018162055 A1 | 9/2018 | |
| WO | 2021048733 A1 | 3/2021 | |

* cited by examiner

1

FORMING APPARATUS FOR A DENTAL OBJECT

CROSS-REFERENCE TO RELATED APPLICATIONS

This application claims priority to European patent application No. 21202631.4 filed on Oct. 14, 2021, which disclosure is incorporated herein by reference in its entirety.

TECHNICAL FIELD

The present invention relates to a forming apparatus for a dental object and a forming method for a dental object.

BACKGROUND

Polychromic glasses and glass-ceramics can be colored by light exposure in combination with a thermal treatment, such as a quartz glass, a quartz glass-ceramic, a lithium aluminosilicate glass, a lithium aluminosilicate glass-ceramic, a lithium silicate glass or a lithium silicate glass-ceramic. In this case, light exposure is usually by means of UV radiation. The distinct color effect is produced after light exposure mainly by an additional temperature treatment.

For this purpose, the polychromic glasses and glass-ceramics comprise, for example, an oxidizable component and a reducible coloring component. The oxidizable component is a component that can be oxidized or excited to emit electrons by irradiation. Oxidizable components include, for example, cerium ions, europium ions, and copper ions, and mixtures thereof. The reducible dye component is, for example, a component that can be reduced to form a color change. Preferred reducible dye components are cations of metals, such as silver, gold, copper, or combinations thereof.

SUMMARY

It is the technical aim of the present invention to provide an application-safe and simple coloring of a dental object while the dental object is being formed.

This technical aim is achieved by subject-matter according to the independent claims. Technically advantageous embodiments are the subject of the dependent claims, the description, and the drawings.

According to a first aspect, the technical problem is solved by a forming apparatus for a dental object, comprising a forming apparatus for producing a predetermined spatial shape of the dental object; and a radiation source for emitting radiation with a wavelength smaller than 350 nm onto the material of the dental object. Since the penetration depth of the UV radiation is limited, it is advantageous to perform the exposure from individual directions already during and/or after the forming.

In a technically advantageous embodiment of the forming apparatus, the forming apparatus comprises a control means for controlling the forming apparatus and/or the radiation source. This provides, for example, the technical advantage that forming as well as corresponding exposure can be performed in a coordinated manner by the control means.

In a further technically advantageous embodiment of the forming apparatus, the control means is configured to control an intensity of the radiation source. This provides, for example, the technical advantage that the coloring can be initiated differently according to the intensity of the radiation.

In a further technically advantageous embodiment of the forming apparatus, the control means is configured to activate the radiation source and the forming apparatus simultaneously or with a time delay. This achieves, for example, the technical advantage that the coloring and the forming take place at a short time interval from one a further.

In a further technically advantageous embodiment of the forming apparatus, the radiation source is a directed and/or focused radiation source. The radiation source may be configured to focus the radiation on the dental object or material. This provides, for example, the technical advantage of activating individual surface areas of the material.

In a further technically advantageous embodiment of the forming apparatus, the forming apparatus comprises a moving means for moving the radiation source. This provides, for example, the technical advantage that the radiation source can be directed to different areas of the material.

In a further technically advantageous embodiment of the forming apparatus, the movement means is configured to move the radiation source in two or three spatial directions and/or to adjust a direction of the radiation source. This provides, for example, the technical advantage that the material can be selectively exposed in different directions.

In a further technically advantageous embodiment of the forming apparatus, the movement means is configured to successively approach various positions. This achieves, for example, the technical advantage that different areas of the material can be activated successively to different degrees.

In a further technically advantageous embodiment of the forming apparatus, the forming apparatus comprises a heating means for heating the dental object. This provides, for example, the technical advantage that the coloring process can be completed within the forming apparatus.

In a further technically advantageous embodiment of the forming apparatus, the forming apparatus is a dental grinding or milling machine. This achieves, for example, the technical advantage that particularly suitable forming apparatus are used for forming.

According to a second aspect, the technical problem is solved by a forming method for a dental object, comprising the steps of producing a predetermined spatial shape of the dental object by a forming apparatus; and emitting radiation having a wavelength smaller than 350 nm onto the material of the dental object by a radiation source. The forming method achieves the same technical advantages as the forming apparatus according to the first aspect.

In a technically advantageous embodiment of the forming method, an intensity of the radiation source is controlled. This also achieves, for example, the technical advantage that the coloring can be initiated in a correspondingly different manner by the intensity of the radiation.

In a further technically advantageous embodiment of the forming method, the radiation source and the forming apparatus are activated simultaneously or with a time delay. This achieves, for example, the technical advantage that the coloring and the forming take place at a short time interval from each other.

In a further technically advantageous embodiment of the forming method, the radiation source is moved. This also achieves, for example, the technical advantage that the radiation source can be directed to different areas of the material.

In a further technically advantageous embodiment of the forming method, the radiation source is moved in two or three spatial directions and/or the direction of the radiation source is adjusted. This achieves, for example, the technical advantage that the material can be specifically exposed in different directions.

BRIEF DESCRIPTION OF THE DRAWINGS

Examples of embodiments of the invention are shown in the drawings and will be described in more detail below.

DETAILED DESCRIPTION

Figure 1:
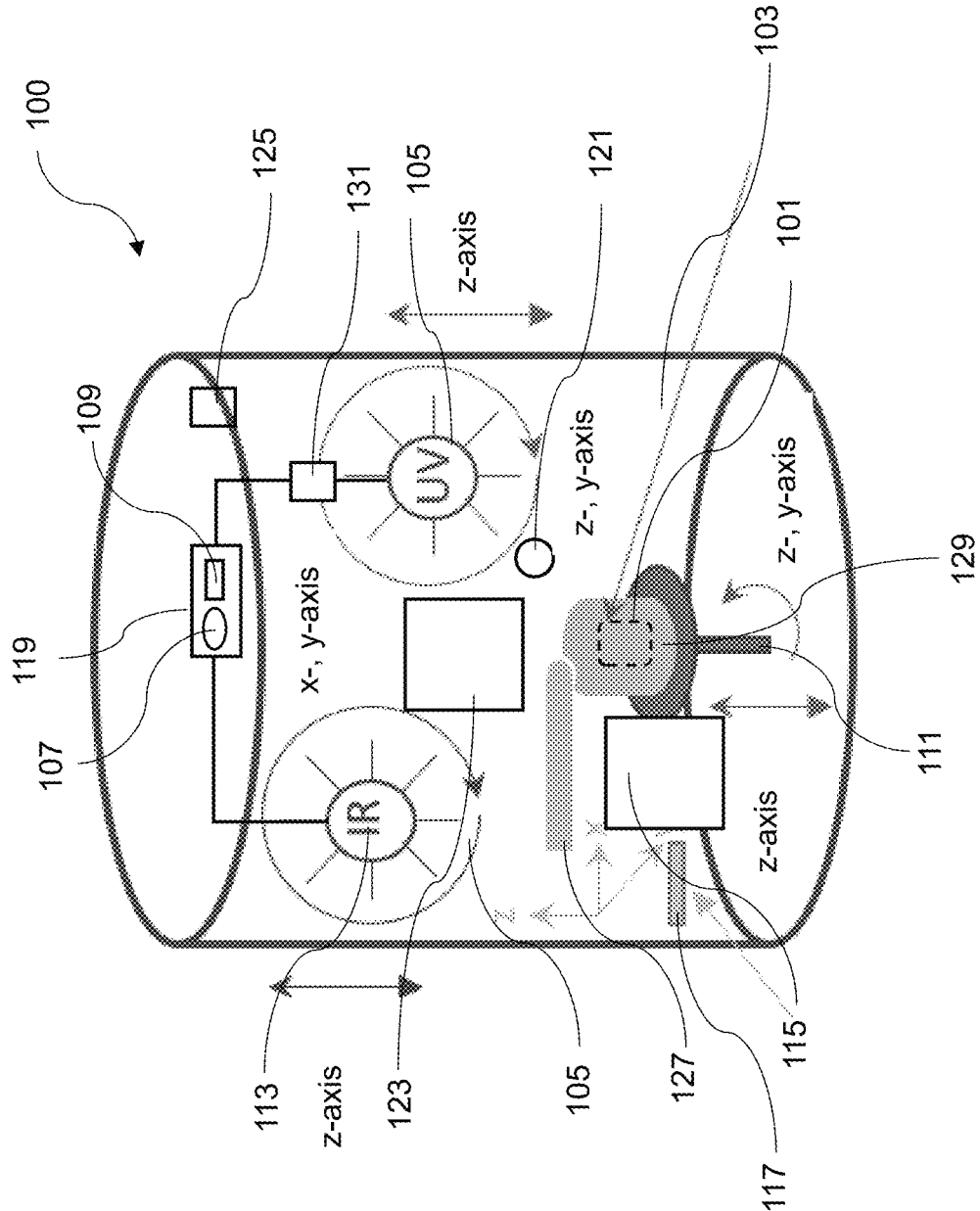
FIG. 1 shows a schematic representation of a forming apparatus for producing a dental object.

FIG. 1 shows a schematic diagram of a forming apparatus 100 for producing a dental object 101. The dental object 101 is a dental restoration, such as a crown, bridge, veneer, abutment, inlay, or onlay. The dental object 101 is made of a polychromic glass and or a polychromic glass ceramic material 129. The material 129 of the dental object 101 is colored by a light exposure with short wavelength together with a thermal treatment. The distinct color effect of the material 129 is produced mainly by a thermal treatment after light exposure.

The forming apparatus or system 100 includes a forming apparatus 127 for producing the predetermined spatial shape of the dental object 101, such as a milling or grinding head. The milling head mills a blank of the material 129 until the blank has the desired shape and appearance. In milling, the machining is performed with a defined cutting edge. In grinding, the machining is performed with an undefined cutting edge. However, the forming apparatus 127 can also be an additive manufacturing machined such as a 3D printer or a polishing means.

The blank is inserted into a chamber 103 of the forming apparatus 100. The chamber 103 may include a door 115 that is opened to allow the blank to be placed inside. To process and expose the material 129, the door 115 is closed so that no removed material 129 or light can exit the chamber 103.

Additionally, the forming apparatus 100 includes a radiation source 105 for emitting radiation having a wavelength less than 350 nm onto the material 129 in process. The radiation source 105 is electrically powered and is formed by, for example, a mercury vapor lamp, a quartz lamp, a black light lamp, a UV laser, or a UV light emitting diode. However, the radiation source 105 may also comprise an X-ray tube for generating X-rays.

The radiation source 105 is suitable to emit radiation with a wavelength between 350 nm and 5 pm, preferably between 350 nm and 10 nm, or most preferably between 350 nm and 100 nm. However, in addition to using UV radiation, it is also possible to expose the material 129 to high energy radiation. For example, with X-rays having a wavelength of 5 pm to 10 nm. However, radiation in the range of 100 nm to 350 nm is particularly preferred.

The emitted radiation is used to expose the material 129. The emitted radiation from the radiation source 105 impinges on the material 129 of the dental object 101 in process. The radiation excites electronic transitions in the material 129 that result in a color change when the material 129 is subsequently heated.

Exposure of the material 129 may be performed during and/or immediately after forming by an ablative or polishing process within the forming apparatus 100. Since the penetration depth of the UV radiation is limited, it is technically advantageous to already perform the exposure from different directions during and/or after the forming process. The processing and exposure of the material is performed within the forming apparatus 100, and the positioning of the material 129 and/or radiation source 105 is also performed by the forming apparatus 100.

Moreover, the forming apparatus 100 may comprise a heating means 113 for local thermal treatment of the shaped dental object 101 and for local color adjustment of the dental object 101. For example, the heating means 113 may be formed by an infrared radiation source, a laser radiation source, a microwave radiation source, or an induction radiation source. The laser radiation source may be formed by a thermal laser or infrared laser, such as a Nd:YAG laser, an Er:YAG laser, a CO-laser or a $CO_2$-laser. The heating means 113 may also be formed by, for example, an electrically powered infrared lamp, a red-light lamp or a heat lamp. Preferred is an IR radiation in the range having a wavelength greater than 700 nm, particularly preferably 700-3000 nm.

If sufficient energy is absorbed by the glass-ceramic, any other wavelength may be used, such as in the visible or UV range, since all that matters for heating is the thermal input into the material 129. Alternatively, the heat treatment may be performed using microwave radiation. The heating means 113 is capable of heating the shaped dental object 101 to a temperature up to 1200° C., in particular in a temperature range between 25° C. and 1200° C., between 25° C. and 1100° C. or between 25° C. and 1000° C.

The heating means 113 may be arranged inside or outside the chamber 103. Radiation guidance into the chamber 103 may be by means of an optical fiber. The heating means 113, such as an IR laser, may also be arranged outside the chamber. The emitted radiation can then be casted by means of a scanner (e.g., DMD—Digital Mirror Device) through a suitable viewing window, onto the material 129 arranged inside the chamber 103. This provides, for example, the technical advantage of heating the material 129 and completing a coloring of the dental object 101.

Areas of the material 129 exposed to the radiation will take on a color after heating, depending on the previous exposure or thermal treatment. This process achieves the technical advantage that the dental object 101 to be produced can be safely exposed and heated in the same device for coloring.

The radiation source 105 may comprise an electrical switch which is actuated when the door 115 is opened, and by which the radiation source 105 is deactivated. This provides the technical advantage of preventing hazardous radiation from escaping from the chamber 103. The radiation source 105 is arranged, for example, in a wall of the chamber 103 so that it can radiate into the interior. A aperture plate 121 may be arranged in front of the radiation source 105 to shield the lateral regions of the radiation, such as a pinhole. This allows the emitted radiation to be directed to specific areas of the dental object 101.

However, the forming apparatus 100 may also include an optical fiber used to deliver radiation from the radiation source 105 to the dental object 101 to be manufactured, such as a fused silica fiber. The radiation source 105 may be disposed behind a special glass, such as a filter disk that allows only predetermined wavelength ranges to pass through.

In order to adjust the intensity of the radiation source 105 or the heating power of the heating means 113, the forming apparatus 100 comprises an adjustment means 107. The adjustment means 107 may be formed by respective controllers that can be used to control the power of the radiation source 105 or the heating means 113. This adjustment means

107 may be used, for example, to adjust the current or voltage at which the radiation source 105 or the heating means 113 is operated.

However, the adjustment means 107 may also be implemented digitally. In this case, the forming apparatus 100 comprises a data interface 117 through which data for controlling the intensity of the radiation source 105 or the power of the heating means 113 can be transmitted from an external device, such as a WLAN interface or a Bluetooth interface.

For example, a mobile phone or tablet can be equipped with a suitable application that can control the intensity of the radiation source 105 or the power of the heating means 113. To this end, the forming apparatus 100 has a control means 119 that communicates with the application and that can increase or decrease the emitted intensity of the radiation source 105 or the power of the heating means 113. The control means 119 may comprise a microprocessor and a digital memory in which data and programs for controlling the functions of the forming apparatus 100 are stored.

In addition, the control means 119 may include a timer means 109 that activates the radiation source 105 or the heating means 113 for a predetermined period of time and automatically deactivates the radiation source 105 or the heating means 113 after the predetermined period of time has elapsed. The control means 119 may activate the radiation source 105 or the heating means 113 simultaneously or with a time delay. This provides the technical advantage of automatically exposing the material 129 for a predetermined exposure time, and providing a defined exposure followed by heat treatment. The control means 119 may be configured to control the intensity of the radiation source 105 and the temperature of the heating means 113 over time, for example using predetermined intensity and temperature profiles.

Examples of predetermining intensity and temperature profiles include, but are not limited to, machine learning algorithms, artificial neural network (ANN), XGBoost, decision trees, and the like. US 20220318520, 20220318683, and Ser. No. 11/408,629 are directed to systems and methods using machine learning algorithms or natural language processing (NLP) and are hereby incorporated by reference in their entirety.

The forming apparatus 100 may include a single or multiple radiation sources 105 for emitting radiation having a wavelength that is less than 350 nm. By having a single radiation source 105, the technical complexity is reduced. When using a single radiation source 105, it is advantageous to move the material 129 in different spatial directions so that the radiation can hit all areas of the dental object 101 to be fabricated.

To this end, the forming apparatus 100 comprises a moving means 111 for moving the material 129 in front of the radiation source 105 or the heating means 113. The moving means 111 is configured to move the material 129 in a height and/or to rotate it with respect to the radiation source 105 or the heating means 113. The axis of rotation is, for example, a vertical axis (z-axis). Along the axis of rotation, the material 129 may additionally be moved linearly. However, the movement means 111 can also be formed by a mechanical arm that can be used to move the material 129 inside the chamber 103. This arm can be used to controllably move the material 129 in front of the radiation source 105.

Both the dental object 101 to be produced and the radiation source 105 or the heating means 113 may be positionable in the x-, y- and z-directions. The movement means 111 is formed, for example, by a turntable on which the material 129 can be arranged. The turntable is rotatable in front of the radiation source 105 or the heating means 113 and is adjustable in a height. For this purpose, the turntable is driven, for example, by electric motors via a suitable mechanism.

For example, the material 129 may be disposed on a movable table that is movable in the three spatial directions. The radiation source 105 may comprise an optical fiber that is movable in the three spatial directions. The movement of the radiation source 105 or the heating means 113 as well as the material 129 can be realized by a robotic arm.

The movement means 111 may also be controlled by the electronic control means 119. A movement program may also be stored in the electronic control means 119 that controls the movement means 111 to move the material 129 in a predetermined time sequence relative to the radiation source 105, the heating means 113, or the forming apparatus 127. Through the movement program, the material 129 can be positioned with respect to the radiation source 105, the heating means 113 or the forming apparatus 127. In doing so, various positions can be approached one after the other.

Conversely, however, it is also possible to move the radiation source 105 or the heating means 113 in a height and/or around the material 129 via a suitable movement means 131. Electric motors may also be driven via a suitable mechanism for this purpose. Generally, the material 129 and/or the radiation source 105 or the heating means 113 are freely movable.

When multiple radiation sources 105 are used, they may be arranged around the material 129. This allows the material 129 to be illuminated from multiple sides. In this case, a movement means 111 can be dispensed with.

The heater 113 may also be movably arranged so that it can be varied in a height and moved around the material 129. An aperture plate 121 may also be arranged in front of the heating means 113 to shield the lateral regions of the radiation, such as a pinhole.

The temperature of the material 129 in the chamber 103 may be determined using a radiation pyrometer or a suitable thermocouple. The thermocouple may be directed to the material 129 for this purpose. The signals about the temperature of the material 129 are fed to the control means 119. In this way, the control means 119 can precisely adjust the temperature to a predetermined value.

The forming apparatus 100 may include an electronic camera 125 for capturing a color value of the material 129. The electronic camera 125 is capable of capturing an image of the material 129. Through the electronic camera 125, for example, an RGB or an L*a*b* color value of the material 129 can be captured and transmitted to the control means 119. By the control means 119, the heating means 113 can be deactivated if the RGB color value corresponds to a predetermined RGB color value.

Once the thermal treatment of the formed dental object 101 is completed, the dental object 101 may be cooled down to room temperature. This is done by means of a cooling means 123 for cooling the heated dental object 101. For example, the dental object 101 is cooled by means of an air flow generated by a fan as the cooling means 123. The cooling means 123 can also be activated and deactivated by the control means 119.

Figure 2:
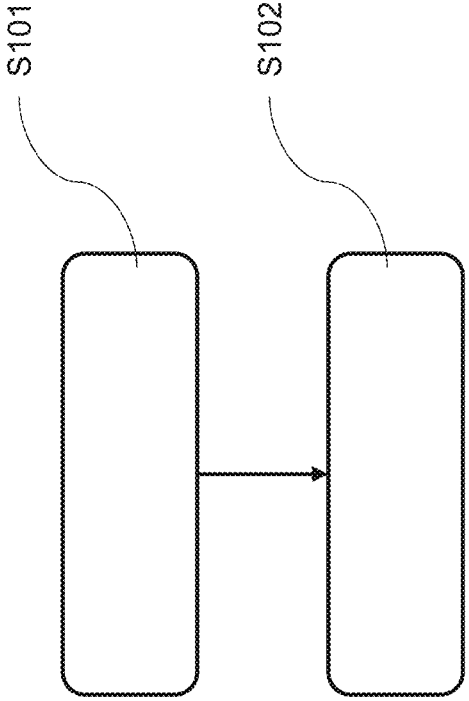
FIG. 2 shows a block diagram of a forming method for a dental object.

FIG. 2 shows a block diagram of a forming method for the dental object 101. The forming method comprises the step S101 of producing a predetermined spatial shape of the dental object 101 by the forming apparatus 127. Further, the forming method comprises the step S102 of emitting radiation having a wavelength smaller than 350 nm onto the material 129 of the dental object 101 by a radiation source 105.

Areas of the material 129, which are exposed to radiation, take on a color after the material 129 is heated, depending on the previous exposure and temperature profile. This method achieves the technical advantage that the dental object 101 can be safely exposed and processed for coloring in the same means.

The exposure of the polychromic glasses and glass-ceramics may be performed in the workflow of forming in the forming apparatus 100. A positive further technical effect may be provided by the radiation from the radiation source 105 with respect to the aging of the grinding media or cooling water, as it has an anti-bacterial effect and drastically extends the duration of use.

All of the features explained and shown in connection with individual embodiments of the invention may be provided in different combinations in the subject matter of the invention to simultaneously realize their beneficial effects.

All method steps can be implemented by means suitable for executing the respective method step. All functions that are carried out by objective means can be a method step of a method.

The scope of protection of the present invention is given by the claims and is not limited by the features explained in the description or shown in the figures.

REFERENCE LIST

100 Forming apparatus or system
101 Dental object
103 Chamber
105 Radiation source
107 Setting means
109 Timer means or timer
111 Movement means
113 Heating means or source
115 Door
117 Data interface
119 Control means or controller
121 Aperture plate
123 Cooling means
125 Electronic Camera
127 Forming apparatus
129 Bulk/Material
131 Movement means

The invention claimed is:

1. A forming system (100) for a dental object (101), comprising a chamber (103) which comprises
  a forming apparatus (127) for producing a predetermined spatial shape of the dental object (101);
a radiation source (105) for emitting radiation with a wavelength smaller than 350 nm onto the material (129) of the dental object (101); and
  a heating source (113) for heating the dental object (101);
  wherein the heating source (113) and the radiation source (105) are separate components.

2. The forming system (100) according to claim 1,
wherein the forming apparatus (127) comprises a controller (119) for controlling the forming apparatus (127) and/or the radiation source (105).

3. The forming system (100) according to claim 2,
wherein the controller (119) is adapted to control an intensity of the radiation source (105).

4. The forming system (100) according to claim 2,
wherein the controller (119) is adapted to activate the radiation source (105) and the forming apparatus (127) simultaneously or with a time delay.

5. The forming system (100) according to claim 1,
wherein the radiation source (105) is a directional and/or focused radiation source.

6. The forming system (100) according to claim 1,
wherein the forming system (100) comprises moving means (131) for moving the radiation source (105).

7. The forming system (100) according to claim 6,
wherein the moving means (131) is adapted to move the radiation source (105) in two or three spatial directions and/or to adjust a direction of the radiation source (105).

8. The forming system (100) according to claim 6,
wherein the moving means (131) is adapted to successively approach various positions.

9. The forming system (100) according to claim 1,
wherein the forming apparatus (127) is a dental grinding or milling machine.

* * * * *